W. A. AUSTIN.
RADIAL TRAILING TRUCK.
APPLICATION FILED FEB. 2, 1914.
1,099,333.
Patented June 9, 1914.
4 SHEETS—SHEET 1.
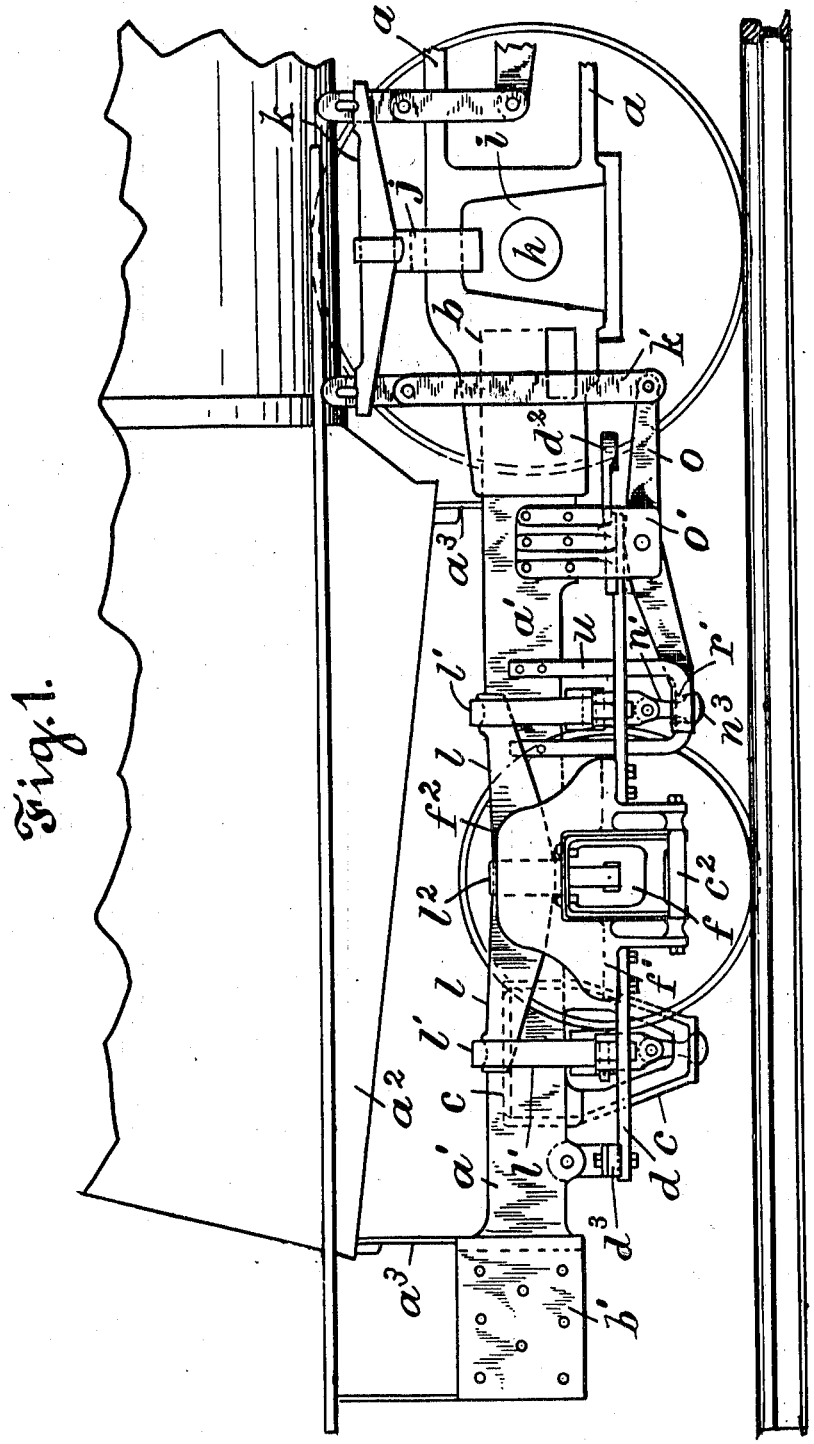

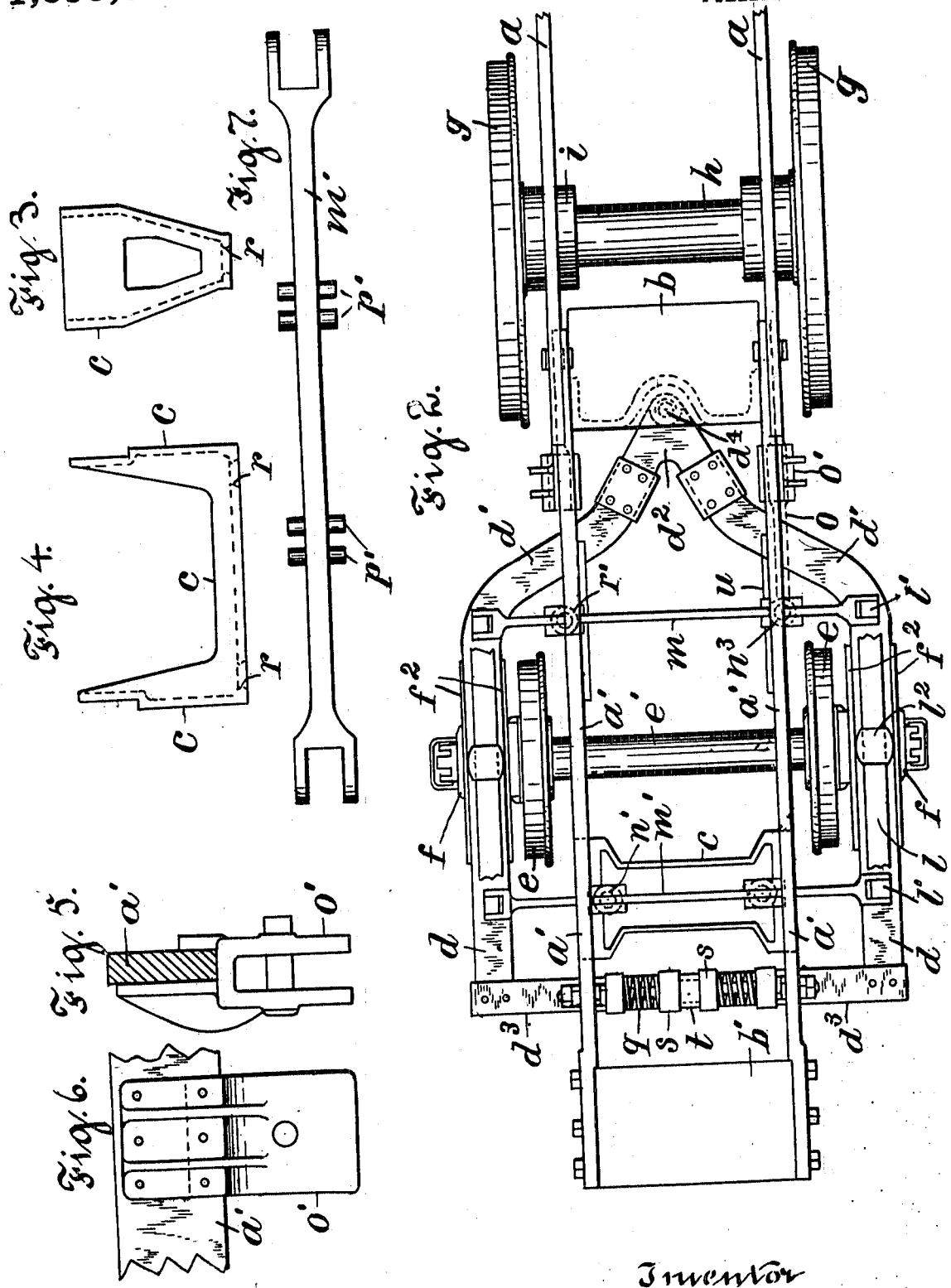

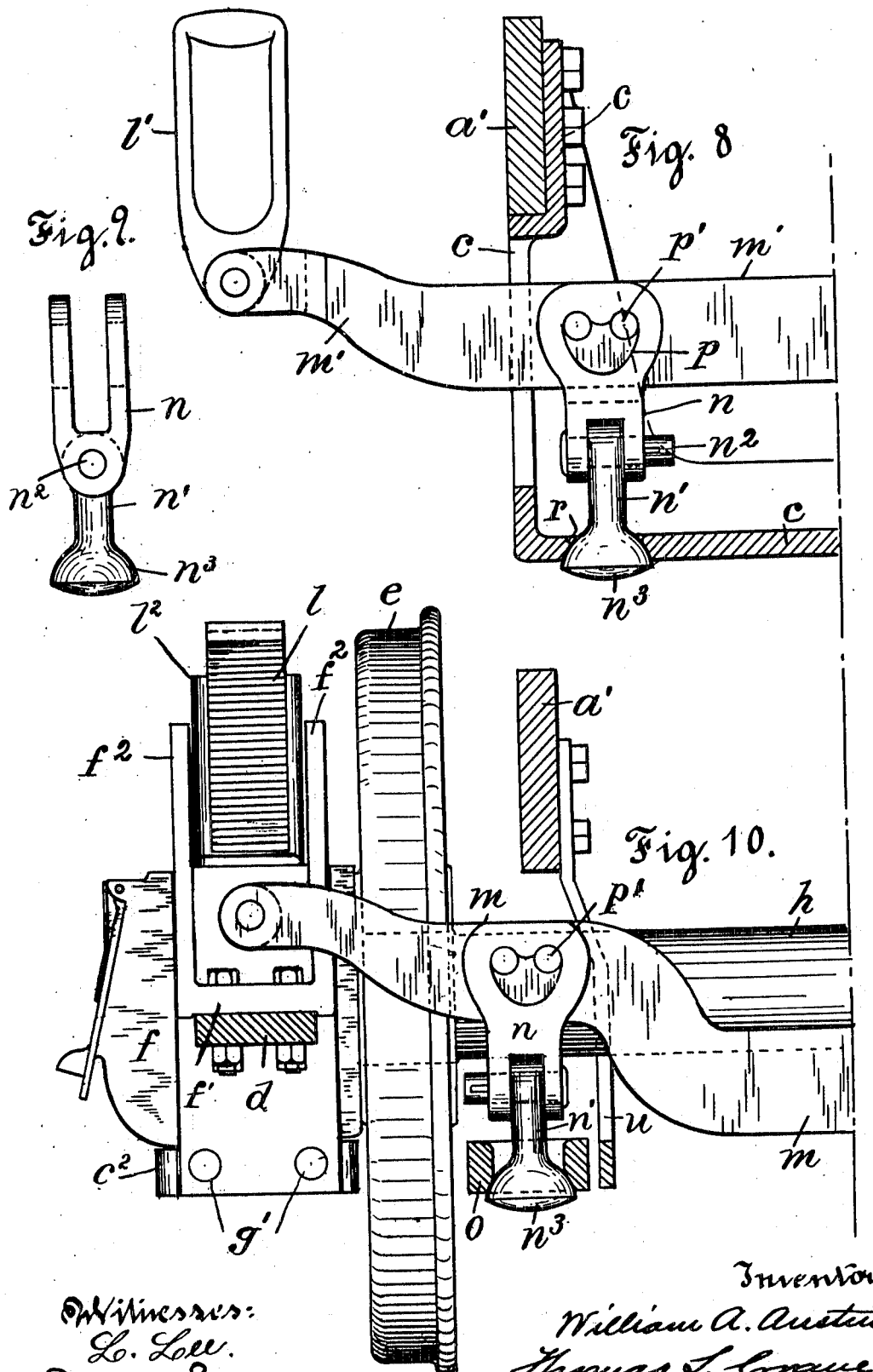

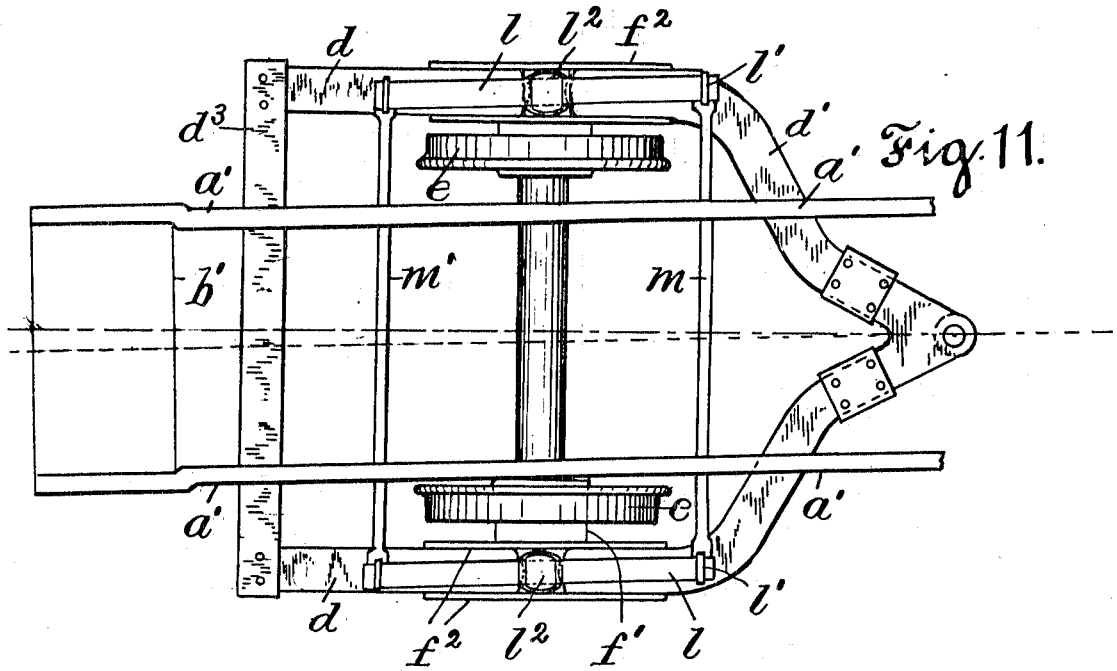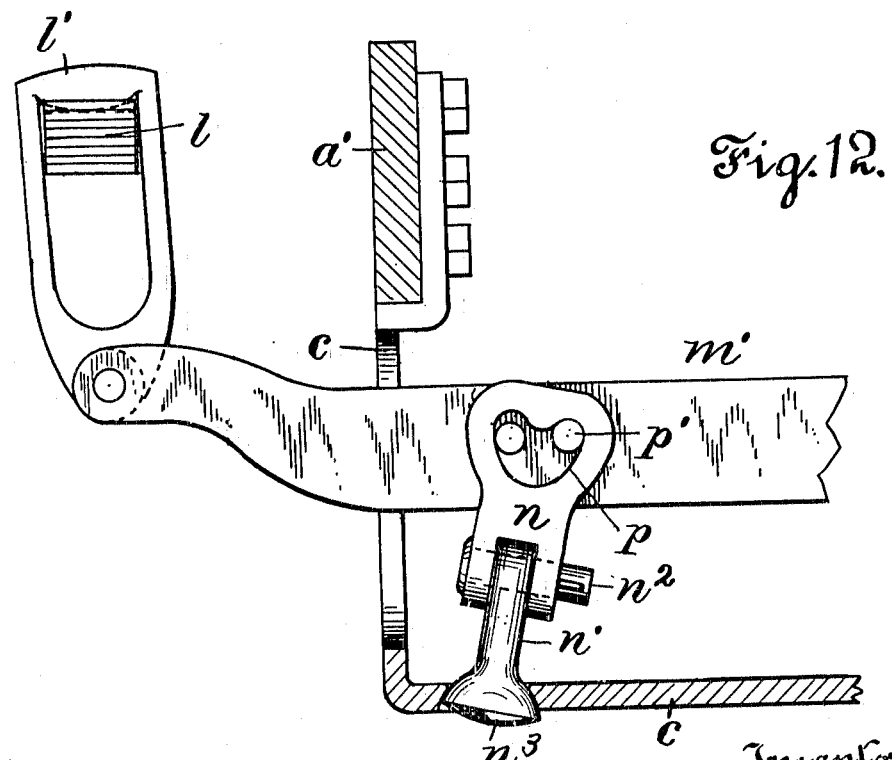

UNITED STATES PATENT OFFICE.

WILLIAM A. AUSTIN, OF LIMA, OHIO, ASSIGNOR TO LIMA LOCOMOTIVE CORPORATION, OF LIMA, OHIO, A CORPORATION OF OHIO.

RADIAL TRAILING TRUCK.

1,099,333.      Specification of Letters Patent.      Patented June 9, 1914.

Application filed February 2, 1914. Serial No. 815,885.

*To all whom it may concern:*

Be it known that I, WILLIAM A. AUSTIN, a citizen of the United States, residing at 415 South Cole street, Lima, county of Allen, and State of Ohio, have invented certain new and useful Improvements in Radial Trailing Trucks, fully described and represented in the following specification and the accompanying drawings, forming a part of the same.

This invention relates to certain improvements in trailing-trucks which support the rear ends of locomotives and which must adapt themselves to irregularities of track-conditions.

The object of the invention is to furnish improved connections for the springs over the journal-bearings in the trailing-truck for transmitting the load from such journal-bearings and for equalizing the weight carried by the truck with the weight carried by the locomotive-drivers. The springs are connected to the equalizing-bar by a cradle and double-jointed links of peculiar construction, which furnish a means by which the force of gravity tends to keep the truck centralized, and special means for steadying the swinging motion of the truck by each of the swinging links. A similar loosely swinging cradle is connected by hangers with the rear ends of the springs, and by other jointed connections with a bracket rigidly attached to the main-frame-bars of the locomotive, the bracket serving as a weight-supporting element which transmits the load to the springs. The journal-bearings are fitted to the axle outside of the wheels which in turn lie outside of the main-frame, and the truck-frame is constructed to extend outside of the truck-wheels to carry the journal-boxes. The equalizing-bars, which connect the driver-springs with the springs over the truck-wheels, lie on the line of the main-frame and thus inside the line of the truck-wheels, and the mechanism for controlling the movements of the truck and the operation of the truck-springs thus partly lies outside and partly inside of the wheels, and provides ample means for operating the truck upon both curved and straight portions of the railway line.

The invention will be understood by the following description and drawing, in which—

Figure 1 is a side elevation of the rear end of the locomotive with the trailer-truck; Fig. 2 is a plan of the same parts; Fig. 3 is a side view, and Fig. 4 an end view of the bracket which supports the rear end of the truck-springs. Fig. 5 is an edge view, and Fig. 6 a face view upon an enlarged scale of the main-frame-bar and the pivot-bearing for the equalizing-bar. Fig. 7 is a plan of the rear cradle for connecting the track-springs to the bracket; and Fig. 8 shows the left-hand half of the cradle connected to the spring and bracket, the parts being in section where hatched at the center line of the bracket. Fig. 9 is an edge view of the double-jointed link; Fig. 10 shows the left-hand half of the cradle for connecting the forward ends of the truck-springs to an equalizing-bar and the driver-springs. Figs. 11 and 12 show the effects of lateral motion on the truck.

$a$ designates the main-frame of the locomotive, and $a'$ extension frame-bars extended backward over the radial-truck. The fire-box $a^2$ is supported upon the radial-truck by the plates $a^3$. The bars $a'$ are connected by a cross-tie $b$ and a bumper $b'$, and the weight-supporting bracket $c$ also connects the frame-bars at the rear portion of the truck. The truck has side-bars $d$ and radius-bars $d'$ connected to a pivot-piece $d^2$ which is pivoted to the cross-tie $b$ by bolt $d^4$. The rear ends of the side-bars are connected by a cross-piece $d^3$, and the side-bars are divided where the journal-boxes $f$ are applied, and the front and rear sections of the side-bars are connected to flanges $f'$ upon side frame-members which receive the boxes. Pedestal-ties $c^2$ connect the jaws $c'$ of the side frame-members which form pedestals for the journal-boxes and retain each of the boxes $f$ in place in the frame-members. The "side frame-members" connect the front and rear sections $d$, $d'$ of the side-bars independently of the pedestal-ties $c^2$, so that the latter can be removed for the purpose of changing the boxes in the pedestals without disconnecting any other parts. Above the journal-bearing the frame-members have lateral cheeks or flanges $f^2$ between which the spring $l$ is fitted with considerable lateral clearance, as shown in Figs. 1 and 10, and the strap $l^2$ of the spring is rounded upon its vertical sides so that the spring may swing between the cheeks $f^2$ when the truck is turning curves, within limits controlled by said cheeks. The bottom of the strap $l^2$ fits a recess in the top of the pedestal to hold the spring from end-movement. The side-bars $d$ extend outside of the wheels $e$ to carry the outside journal-boxes $f$, the truck-wheels $e$ lying outside of the frame-bars the same as the main-drivers $g$. The axle $h$ of the drivers is carried by journal-boxes $i$ to which the forked strap $j$ transmits the load upon the spring $k$. The rear end of the driver-spring $k$ is connected by link $k'$ to the forward end of the equalizing-bar $o$. The ends of the truck-springs are connected with two floating cradles which hang upon the ends of the springs and have a loose jointed connection, at their rear ends, with a rigid bracket upon the frame $a'$, and at the front end with the driver equalizing-bar.

The rear ends of the truck-springs $l$, which are omitted in Fig. 2 to show the ends of the cradles, are connected by hangers $l'$ with the rear cradle $m'$ which extends from the center line of one of the truck-springs to the center line of the other, and is connected by double-jointed links to the rigid frame-bracket $c$. The upper and lower portions of the links are united by joint-pins $n^2$, and the lower end $n'$ of the link has an enlargement $n^3$ bearing upon the lower side of a socket $r$ upon the bottom of the bracket $c$, and having segmental spherical shape to rock freely in said socket. The upper half of the link is forked, as shown in Fig. 9, to embrace the opposite sides of the cradle $m'$, and its cheeks are formed with heart-shaped slots $p$ to fit upon two adjacent fulcrum-pins $p'$ at each side of the bracket, to permit a rocking motion of the link thereon. The joint $n^2$ of the links is at right-angles to the joint of the end $n'$ with the cradle, thus permitting free bending in every direction, and the spherical joint connection upon the link-end $n'$, or equalizing-bar $o$ forms a pivotal connection which permits the connected parts to change their angle to one another. The links swing loosely on the springs and both cradles are connected to the links in a similar manner, and form therewith a floating connection to the equalizing system on the rigid locomotive-frame. The bracket $c$ is rigidly attached to the frame-bars $a'$ and any vertical motion of the cradle $m'$ is thus prevented, while the joint $n^2$ and the spherical connection $n^3$ permit the cradle to swing freely upon such link in any direction, especially lengthwise when the truck swings laterally. The forward ends of the truck-springs are connected to the equalizing-bar $o$ by a similar cradle $m$ and double-jointed links $n'$, the enlargement $n^3$ upon the lower end of the link being engaged with a socket $r'$ upon the rear end of the equalizing-bar $o$, which is pivoted beneath the main-frame in a bracket $o'$. A loop-shaped strap $u$ (see Fig. 1) encircles the cradle $m$, and such a strap is attached to each of the frame-bars $a'$ to prevent such cradle from falling upon the track if the connections become detached. The springs upon the truck are thus connected by freely swinging links with the main-frame-bars $a'$, through the bracket $c$; and with the main equalizing-levers $o$ by direct engagement of double-jointed links with their rear ends.

The use of the floating cradles at both ends of the springs, with flexible connections such as described, permits the utmost freedom of movement in the truck beneath the locomotive-frame. The connection of the double-jointed links with the cradle $m$ or $m'$ by two adjacent fulcrum-pins $p'$ permits and causes the link, when the cradle moves endwise, to tip clear from one of the pins and transfers the entire load to the other pin, as shown in Fig. 12. The effect of gravity is to strain the link $n, n'$, back to a vertical position as soon as the line of railway track permits; the same being true of both cradles, although the rear cradle has much more longitudinal movement than the forward cradle, as it is farther from the truck-pivot $d^4$.

An auxiliary spring-centering device consisting of springs $q$, cups $s$ fitted to their ends, and a lug $t$ fastened to the rear of the truck-frame to press against the cups, is shown in Figs. 1 and 2; but this device is not essential to the operation of the truck.

From the above description it will be observed that when passing curved portions of the track the truck-wheels $e$ swing sidewise in a radial manner controlled by the pivoted end $d^2$ of the radius bars, and in so swinging carry with them the axle $e'$ with the journal-boxes thereon. The pedestal or frames for the boxes being permanently fastened to the truck-frames $d$ thus carry the entire floating structure in the swinging motion described, and move the springs $l$ somewhat from their normal position. The ends of the springs, attached by spring-hangers $l'$ to the swinging cradles $m, m'$, tend to carry these swinging cradles with them as far as the restraining influence of the swinging double-jointed links will allow. The rear swinging cradle $m'$ has that portion of the load which it carries transferred through the swinging links to the weight-supporting bracket $c$ at the rear of the truck, and so ultimately to the locomotive frame-bars $a'$. The front swinging cradle $m$ has that portion of the load which it carries transferred through the swinging links to the equalizing-bars $o$, which connect the truck-weight-carrying mechanism with the weight-carrying mechanism of the locomotive and finds its support in the fulcrums $o'$ attached to the locomotive frame-bars, a balancing effect from the other end of the bars $o$ equalizing the weight carried by the truck with the weight carried by the locomotive drivers. When passing again to a straight track, the truck-equalizing mechanism adjusts itself centrally by the effects of gravity, with or without the aid of a spring centering device, and the truck-wheels thus come again into alinement with the driving-wheels of the locomotive.

It will be noted that the straps $l^2$ of the springs $l$ are only restrained from movement by the plates $f^2$ of the side frame members, and that they are thus allowed a certain amount of swinging movement to accommodate the radial rotations of the front and back swinging cradles. (See Fig. 11.)

The relative fore and aft movement of the sides of the truck is taken up by the combined swinging movement of the swing-hangers $l'$ and the lower portion $n'$ of the double-jointed links. The twisting effects due to radial fore and aft variations are taken up by the spherical ends of the swinging links $n$, $n'$.

The cradles, in their arrangement and operation differ from any of the cross-bars heretofore used in the equalizing mechanism of radial trucks, as neither of them is rigidly attached to the frame-bars of the locomotive and neither of them is restricted to a mere vertical or longitudinal movement, but both are "floating cradles", and either one of them is free to move in any direction that their links or connections may permit, and such movement also operates to slightly raise the load imposed upon the truck-springs, so that the load itself produces a direct and immediate tendency to re-center the truck, when a straight track is reached.

From the above description it is evident that the controlling mechanism of the truck is located both inside and outside of the truck-wheels, so that while the truck journal-bearings are outside of the wheels with the advantage of leaving the space below the fire-box open, the connection may be made with the equalizing-bars under the main-frame-bars of the locomotive, without employing any diagonally arranged equalizing-bars.

By suspending the cradles from the front and rear ends of the springs by the hangers $l'$, universal couplings may be extended from any point in their length to equalizing-bars under the main-frame-bars, approximately in line with the equalizing system on the locomotive frames.

It will be understood that the invention is not limited to the particular constructive forms shown in the drawing, as two brackets may be provided upon the frame-bars $a'$ instead of the single load-supporting bracket $c$ which is shown in Fig. 2, such bracket or brackets serving as the final load-carrying fulcrum at the rear end of the truck, and constituting the final element of the equalizing-gear for the entire spring-supporting system, in which all the equalizing-levers or bars may be disposed on a line with the main-frame bars of the locomotive, as shown in the drawings. Such disposition of the equalizing-bars makes them parallel with one another and avoids the use of oblique mountings and connections with the increased expense thereof.

An auxiliary centering device is not claimed herein as it forms no part of the present invention, but can be applied when desirable.

The particular construction of the trailer truck-frame is immaterial, as well as the means by which it is connected with the pedestals, and other constructive features may be modified provided the essential elements of the invention are employed, which are pointed out in the claims appended hereto.

Great advantages may be secured by this construction, as the wheels and axles are removable with the journal-boxes by releasing the pedestal-ties $c^2$, thus facilitating repair or replacement.

All parts, excepting wheels, axles and journal-brasses can be standardized and used for all the trailer-trucks upon a given railroad; thus permitting diverse wheels, axles and journal-brasses to be used, by providing them with suitable journal-boxes to fit the standard pedestals upon the side frame-members of the truck.

Having thus set forth the nature of the invention what is claimed herein is:

1. In a trailing truck, the combination, with a truck-frame pivoted to the frame of a locomotive and having wheels and an axle, with journal-boxes outside of such wheels, of springs mounted upon the truck-frame above the journal-boxes, a fulcrum-bracket attached to the locomotive-frame near the rear end of the truck-frame, means connecting the forward ends of the springs with the equalizing system of the locomotive, and means connecting the rear ends of the springs with the fulcrum-bracket between the locomotive frame-bars.

2. In a radial trailing truck, the combination, with a truck frame pivoted to the locomotive-frame bars, of pedestals fitted to the truck-frame, journal-boxes fitted therein, wheels having an axle fitted to the boxes, springs over the journal-boxes, and two floating cradles having swinging connections to the front and rear ends respectively of the springs and swinging connections also to the main frame and to the equalizing-bar, the swinging connections to the springs being outside of the truck-wheels and the swinging connections to the main-frame being inside of the truck-wheels, so as to divide the total swing between the various swinging connections and thus reduce the angular stress upon each particular member.

3. In a trailing-truck, the combination, with the locomotive-frame, of a truck-frame pivoted thereto and having side-bars divided and side frame-members provided with flanges $f'$ fitted between such side-bars and secured to the same, such side-frame members having jaws projected below, divided frame-members forming pedestals open at the bottom, and provided with pedestal-ties connected to such jaws and movable therefrom without disconnecting any other parts of the truck.

4. In a trailing-truck, the combination, with the locomotive-frame, of a truck-frame pivoted thereto and having side-bars divided, and side-frame-members provided with flanges $f'$ fitted to such side-bars and secured to the same, such side frame-members having jaws fitted to journal-boxes outside of the truck-wheels, such jaws forming pedestals open at the bottom and provided with pedestal-ties connected to such jaws and removable therefrom independent of all other parts of the truck, whereby the axles and wheels can be removed from the truck without detaching the side-frame-members from the frame-bars.

5. In a radial trailing-truck, the combination, with a truck-frame pivoted to the locomotive-frame, of pedestals fitted to the truck-frame, journal-boxes fitted therein, wheels having an axle fitted to the boxes, springs over the journal-boxes, and two floating cradles having swinging connections to the front and rear ends respectively of the springs and swinging connections also to the main-frame and to the equalizing-bars, whereby the radial, fore-and-aft and twisting motions of the cradles are divided among the various connections.

6. In a radial trailing-truck, the combination, with a truck-frame pivoted to the locomotive-frame, of pedestals fitted to the truck-frame outside of the truck-wheels and holding journal-boxes removably, springs over the journal-boxes, and two floating cradles having swinging-connections to the front and rear ends of the said springs and also to the main-frame and to the equalizing-bar, whereby both cradles are permitted to move endwise when the truck passes around curves.

7. In a radial trailing-truck, the combination, with a truck-frame pivoted to the locomotive-frame, of side frame-members inserted in the side-bars of such truck-frame and having jaws forming pedestals open at the bottom with pedestal-ties connecting such jaws, and having lateral cheeks with springs fitted between the same, two floating cradles provided with equalizing connections, and the springs having sufficient clearance between the lateral cheeks to swing within limits controlled by said cheeks and thus reduce the radial variations in the component members of the said connections which allow the truck to change its alinement from the alinement of the locomotive driving-wheels.

8. In a radial trailing-truck, the combination, with a truck-frame pivoted to the locomotive-frame, of pedestals fitted to the truck-frame, journal-boxes fitted therein, wheels having an axle fitted to the boxes, springs over the journal-boxes, and two floating cradles arranged respectively at the front and rear of the truck-wheels, swinging-hangers connecting the same to the ends of the truck-springs, and swinging-links connected to the cradles by transverse pivots and jointed intermediate to their ends by pivots at right-angles to those in the cradles, to allow fore and aft, transverse and twisting movements to be taken up by the springs, spring-hangers, floating cradles and swinging-links.

9. In a radial trailing-truck, the combination, with a truck-frame pivoted to the locomotive-frame, of pedestals fitted to the truck-frame with journal-boxes therein and axles and wheels fitted thereto, floating cradles arranged at the front and rear of the wheels, hangers connecting the springs with the cradles, a fulcrum-bracket attached to the locomotive-frame near the rear cradle, and swinging-links connecting the cradle with the bracket to allow the flexible supporting of the weight at the final supporting fulcrum upon the rear of the truck.

10. In a radial trailing-truck, the combination, with the truck-frame pivoted to the locomotive-frame, of pedestals with open bottom fitted to the truck-frame, journal-boxes fitted removably to such pedestals, and axles and wheels mounted in said journal-boxes, springs mounted upon the pedestals and having a limited swinging motion thereon, two floating cradles arranged at the front and rear of the wheels, spring-hangers connecting the ends of the springs with the ends of the cradles, and swinging-links connecting the cradles to the equalizing system on a line with the main-frame of the locomotive.

11. In a radial trailing-truck, the combination, with the truck-frame pivoted to the locomotive-frame, of pedestals with open bottom fitted to the truck-frame, journal-boxes fitted removably to such pedestals, and axles and wheels mounted in said journal-boxes, springs mounted upon the pedestals and having a limited swinging motion thereon, two floating cradles arranged at the front and rear of the wheels, spring-hangers connecting the ends of the springs with the ends of the cradles, and swinging-links connecting the cradles to the equalizing system on a line with the main-frame of the locomotive, the forward cradle being allowed free vertical movement and also transverse movement controlled by the hangers and swinging-links connecting the cradle to the equalizing system.

12. In a radial trailing-truck, the combination, with the truck-frame pivoted to the locomotive-frame, of pedestals with open bottom fitted to the truck-frame, journal-boxes fitted removably to such pedestals, and wheels with axles mounted in said journal-boxes, springs mounted upon the pedestals and having a limited swinging motion thereon, two floating cradles arranged at the front and rear of the wheels, spring-hangers connecting the ends of the springs with the ends of the cradles, and swinging-links connecting the cradles to the equalizing system on a line with the main-frame of the locomotive, the forward cradle being allowed free vertical movement and also permitted transverse movement controlled by the hangers and swinging-links connecting the cradle to the equalizing system, a weight-supporting bracket upon the locomotive-frame at the rear of the truck and the rear cradle being restrained from vertical movement and allowed transverse movement controlled by the hangers and swinging-links connecting the cradle with the said bracket.

13. The combination, with the frame of a locomotive, of a radial trailing-truck-frame pivoted thereto at its forward end and having side-frame members outside of the truck-wheels with pedestals thereon, journal-boxes mounted in the pedestals, means for securing the journal-boxes removably, a spring mounted on each side of the frame-member and having a limited swinging movement thereon, two transverse floating cradles, at the front and rear of the truck-wheels, swinging-hangers coupling them respectively to the front and rear ends of such springs, and allowing fore-and-aft swinging movement of the hangers and a controlled transverse movement of both cradles, and the front cradle having double-jointed links connected with an equalizing-bar of the equalizing system and having vertical movement due to the movement of such equalizing-bar.

In testimony whereof I have hereunto set my hand in the presence of two subscribing witnesses.

WILLIAM A. AUSTIN.

Witnesses:
   L. R. WRIGHT,
   F. WELLS.